(12) United States Patent
Boufounos et al.

(10) Patent No.: US 8,487,808 B2
(45) Date of Patent: Jul. 16, 2013

(54) HIGH RESOLUTION SAR IMAGING USING NON-UNIFORM PULSE TIMING

(75) Inventors: Petros Boufounos, Boston, MA (US); Dehong Liu, Lexington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 0 days.

(21) Appl. No.: 13/077,597

(22) Filed: Mar. 31, 2011

(65) Prior Publication Data

US 2011/0175770 A1 Jul. 21, 2011

(51) Int. Cl.
*G01S 13/00* (2006.01)
(52) U.S. Cl.
USPC ........................................ 342/25 R

(58) Field of Classification Search
USPC ............................................. 342/25
See application file for complete search history.

(56) References Cited

U.S. PATENT DOCUMENTS

| | | | |
|---|---|---|---|
| 5,150,125 A * | 9/1992 | Hager | 342/120 |
| 7,928,900 B2 * | 4/2011 | Fuller et al. | 342/175 |
| 7,973,703 B2 * | 7/2011 | Burri et al. | 342/147 |
| 2002/0171056 A1 * | 11/2002 | Paese et al. | 251/129.04 |
| 2008/0278371 A1 * | 11/2008 | Holmberg et al. | 342/26 B |
| 2009/0102706 A1 * | 4/2009 | Goldblatt et al. | 342/352 |
| 2009/0237292 A1 * | 9/2009 | Tigrek et al. | 342/109 |
| 2010/0039311 A1 * | 2/2010 | Woodington et al. | 342/70 |

\* cited by examiner

*Primary Examiner* — Timothy A Brainard
(74) *Attorney, Agent, or Firm* — Dirk Brinkman; Gene Vinokur

(57) ABSTRACT

A synthetic aperture radar (SAR) system includes a non-uniform pulse generator, and an echo receiver. A SAR image is reconstructed from samples of received echoes, wherein transmitted pulses and reflected echoes overlap in time.

14 Claims, 5 Drawing Sheets

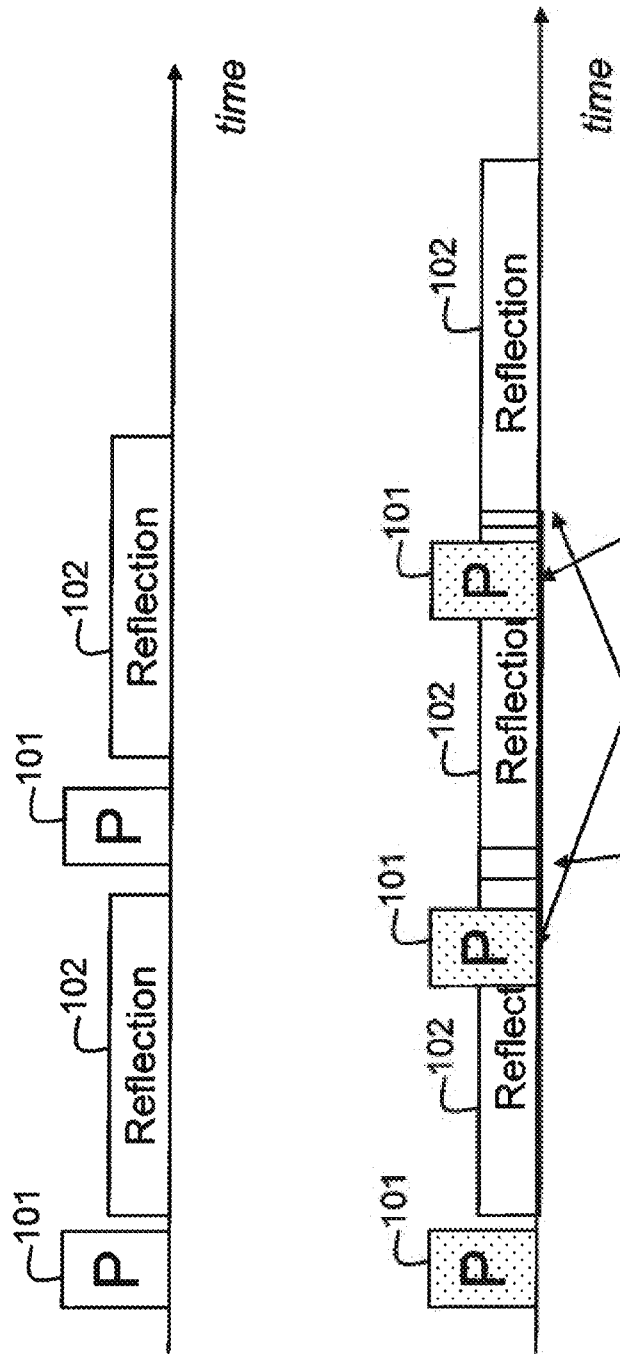
Prior Art
Fig. 1A
Prior Art
Fig. 1B

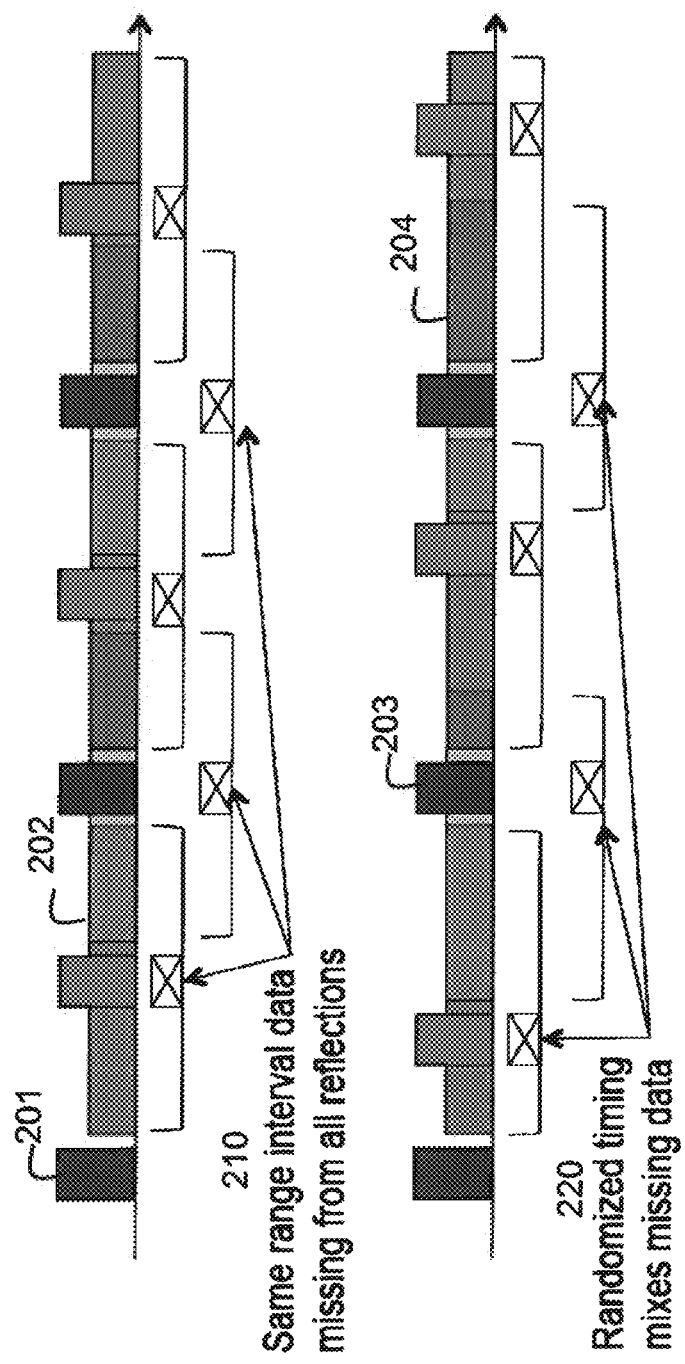

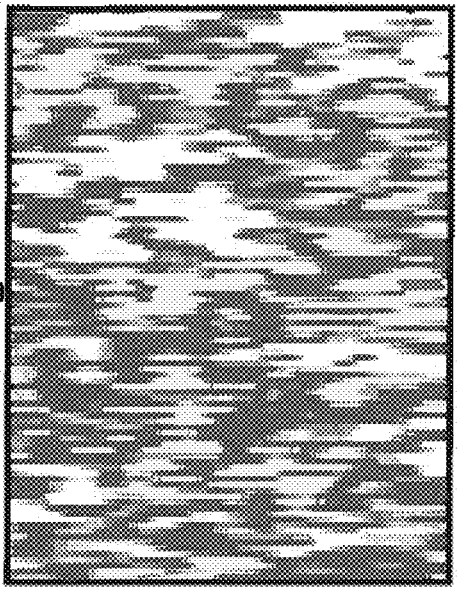
Fig. 3A Ground truth
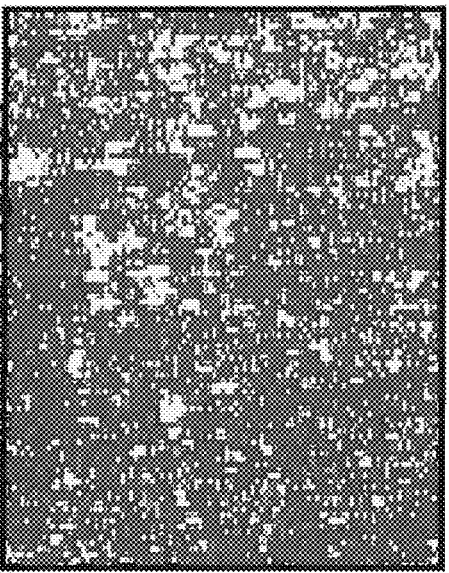
Fig. 3B Prior Art
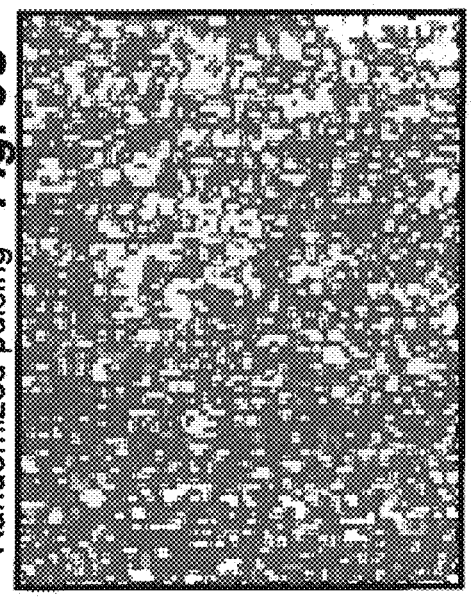
Fig. 3C Randomized pulsing

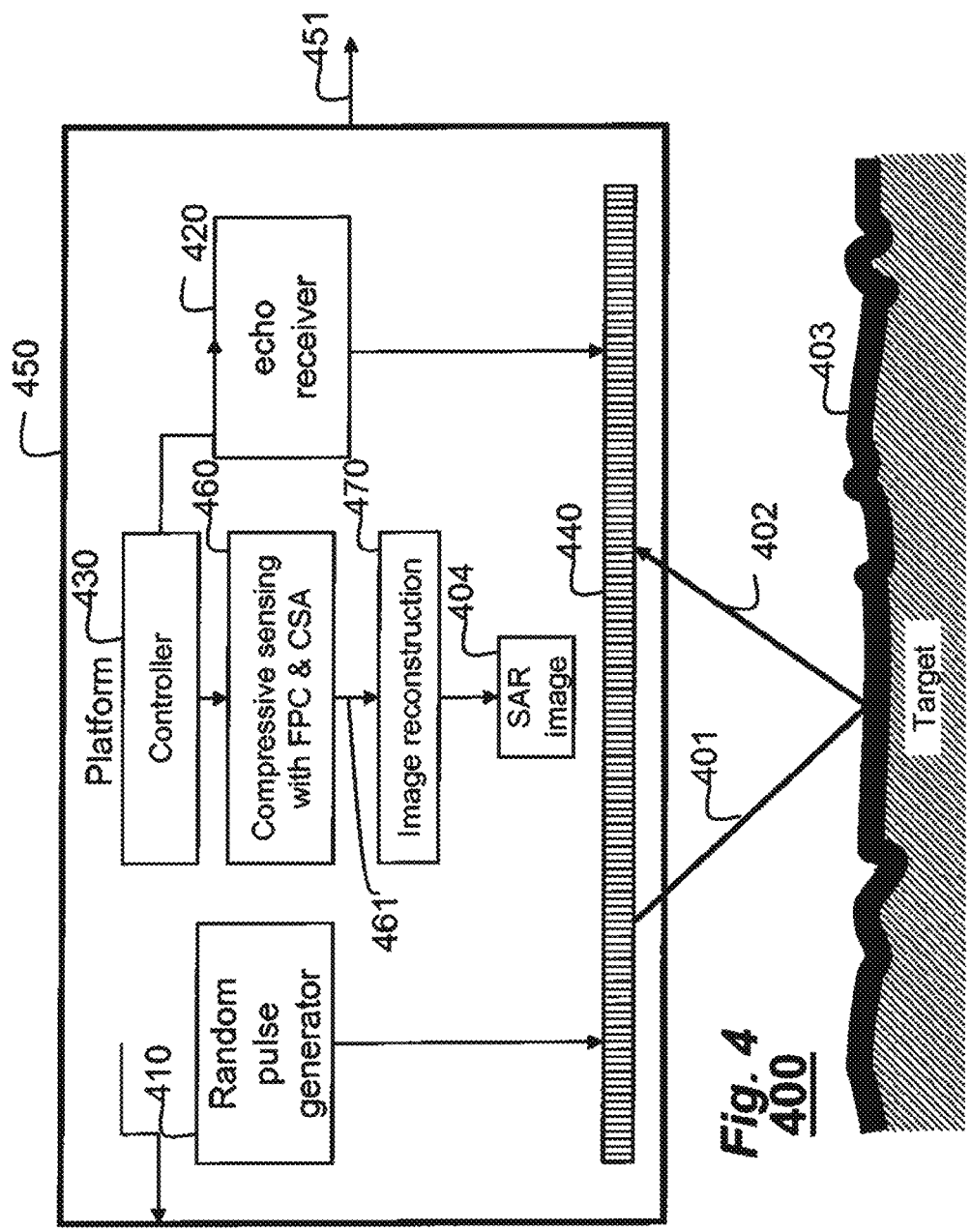
Fig. 4
400

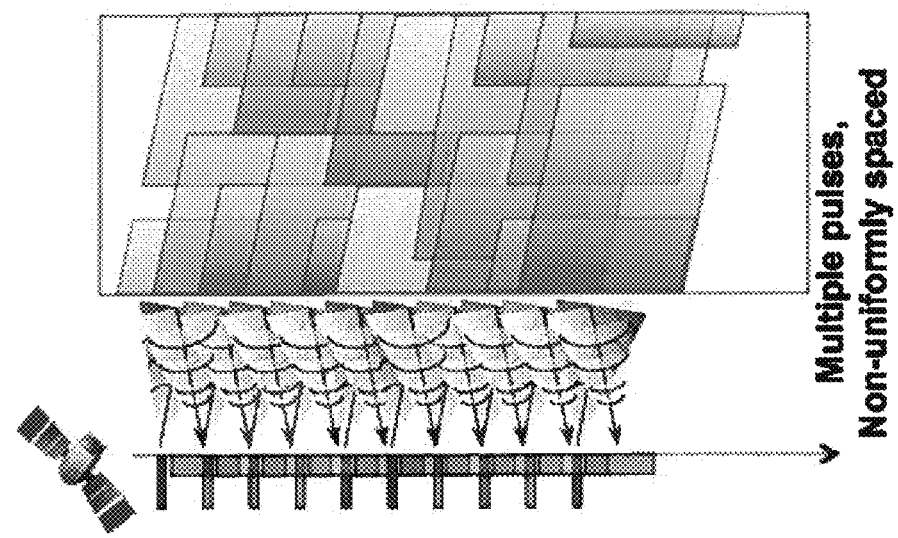
Fig. 5B
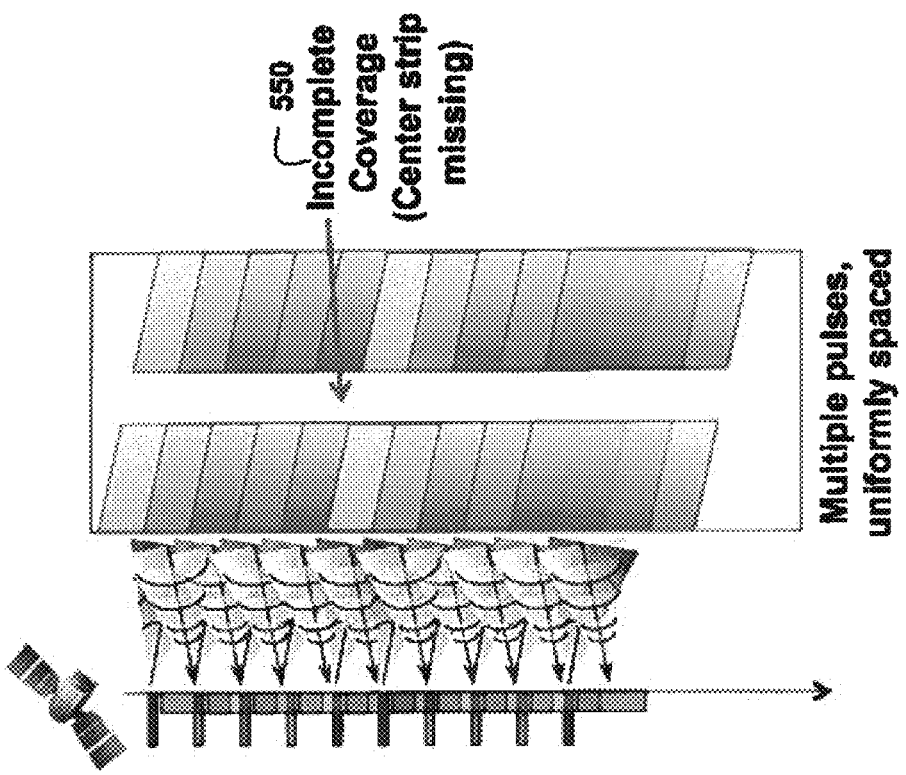
Fig. 5A

HIGH RESOLUTION SAR IMAGING USING NON-UNIFORM PULSE TIMING

FIELD OF THE INVENTION

This invention relates generally to synthetic aperture radar (SAR), and more particularly to a method and system where radar pulses are non-uniformly timed.

BACKGROUND OF THE INVENTION

Synthetic aperture radar (SAR) is a high resolution radar imaging technology with significant interest in remote sensing applications. SAR exploits the motion of a radar platform, such as a satellite, a plane, a vehicle, or a boat, to synthesize a virtual array with a very large aperture that can image large areas at a high resolution.

Conventional SAR transmits pulse signals at a uniform rate. The transmitted pulses are usually linearly frequency-modulated (FM) chirps, of increasing or decreasing frequency (upchirps or downchirps, respectively). The corresponding received echoes, reflected from the region of interest, are processed to reconstruct a two-dimensional complex-valued image (i.e., the desired information is conveyed both in the magnitude and the phase of the image). The resolution of the image on the axis perpendicular to the motion of the platform (range) is determined by the bandwidth of the transmitted pulse, while the resolution along the axis of motion (azimuth) depends on the pulsing rate or pulse repetition frequency (PRF).

Conventional SAR exhibits a fundamental trade-off between the resolution of the azimuth and the length of the range imaged. This is due to the need to separate the pulse transmission from the echoes reception. Most conventional SAR systems use the same antenna for the transmission of the pulse and the reception of the received echoes. Thus, while a pulse is transmitted, the radar cannot receive the reflected echo of another pulse. Even when the antennas are separate, their proximity causes significant interference at the receiving antenna during the pulse transmission of the transmitting antenna. Thus the received signal contains minimal, if any, information from the reflected echo.

If the PRF is very high, the transmitted pulses interfere with the reception of the received echoes and cause missing data. In other words, the time interval between two transmitted pulses has to be long enough so that the reflected echoes can be fully acquired before a next pulse is transmitted.

SUMMARY OF THE INVENTION

Synthetic aperture radar (SAR) is a fundamental technology with significant impact in remote sensing applications. SAR relies on the motion of the radar platform to synthesize a large aperture, and achieve high resolution imaging of a large area. However, conventional SAR systems, relying on uniform pulsing, suffer from a fundamental trade-off between the azimuth resolution and the range coverage length.

The embodiments of the invention overcome this trade-off by using non-uniform pulse timing—which can, for example, be random or pseudorandom—combined with incoherent pulsing and non-linear reconstruction. The invention provides a significant improvement in the resolution, without compromising the range length of the imaged area.

BRIEF DESCRIPTION OF THE DRAWINGS

FIG. 1A is a timing diagram of prior art uniform pulses and reflected echoes;

FIGS. 1B and 2A is a timing diagram of prior art uniform pulses and reflected echoes when the PRF is high and the received echoes interfere with each other and with the transmitted pulses;

FIG. 2B is a timing diagram of random pulses according to embodiments of the invention;

FIGS. 3A-3C compare a ground truth SAR image, a prior art SAR image, and a SAR image according to embodiments of the invention; and FIG. 4 is a block diagram of a SAR system and method according to embodiments of the invention.

FIG. 5A is a schematic of ground coverage for prior art uniformly spaced pulse timing for a high pulse repetition frequency (PRF); and FIG. 5B is a schematic of ground coverage for non-uniformly spaced pulse timing for a high average PRF.

DETAILED DESCRIPTION OF THE PREFERRED EMBODIMENT

To avoid interference of two overlapping pulses, the embodiments of our invention may use incoherent pulsing. Specifically, we ensure that nearby pulses are orthogonal or significantly incoherent, for example, an upchirp is followed by a downchirp. Then, an iterative reconstruction method can separate overlapping responses, while reconstructing the image. Using incoherent pulsing improves the resolution but is not necessary in the embodiments of the invention.

Our SAR pulsing scheme significantly improves the trade-off between range length and azimuth resolution, and overcomes the fundamental limitations of conventional pulsing. Embodiments of our invention combine the following novel features.

1) Pulse timing is randomized pulse timing with a relatively high average PRF and small minimum interval between pulses to achieve high azimuth resolution and to evenly distribute missing data due to pulse transmissions to all the available range.
2) The pulses may be orthogonal or incoherent with respect to each other to enable improved separation of overlapping received pulses.
3) An iterative reconstruction procedure handles missing data and overlapping pulses, and incorporates image models.

Part of the invention is motivated by recent results in compressive sensing (CS). CS fundamentally revisits signal acquisition and enables sampling, and guaranteed reconstruction of signals with a significantly smaller number of samples than the Nyquist rate. In signal processing, the Nyquist rate is two times the bandwidth of a bandlimited signal, or the minimum sampling rate required to avoid aliasing. This sampling rate reduction is achieved by using randomized sampling, improved signal models and computational reconstruction procedures.

The randomization ensures that the linear samples are incoherent and fully acquire the pulses. Thus, the samples can be inverted by a non-linear reconstruction process using the model to recover the acquired pulses, and reconstruct the SAR mage.

FIG. 1A show uniform pulses 101 and reflected echoes 102 with the timing used in the prior art. The timing of the transmitted pulses is such that the reflected echoes are entirely contained between the transmitted pulses.

FIG. 1B shows the uniform pulses 101 and reflected echoes 102 with uniform timing, as used in the prior art, and with high PRF (i.e., small timing interval between transmitted pulses). The figure demonstrates that the received echoes overlap with each other and with the transmitted pulses, which causes interference 110 and missing data 120. The algorithms in the prior art cannot cope with such issues.

FIG. 2A shows uniform pulses 201 and reflected echoes 202 as used in the prior art, but with incoherent pulses (e.g., upchirp and downchirp) alternating in the transmission. For frequent pulsing, two or more reflections might overlap, and more than two different pulses are necessary to be able to better separate the reflections. Even if the pulses are separated, the interference from the transmitted pulse causes missing data 210 in the response. If the pulsing timing is regular, the missing data 220 are always located in the same range location of the reflected pulse.

Generally, iterative methods are able to handle the missing data. However, even the best approach will still have problems when the same range locations are always missing. The resulting image will have an unrecoverable region 550, i.e., the center strip is missing at that range location interval.

As shown in FIG. 2B, we avoid this problem by making the timing of the pulse 203 non-uniform in embodiments of the invention. This can be achieved, for example, by randomizing or pseudo-randomizing the pulse timings, in one embodiment, or by using a periodic non-uniform sequence in another embodiment. Then, the non-uniformly timed reflections 204 ensure that the missing data from reflected pulses are at different location in time. Because the responses overlap significantly in the azimuth, this also ensures that the missing data are evenly distributed in the SAR image, and coverage of an area of interest is approximately uniform. An example of this coverage is shown in FIG. 5B.

Image Reconstruction

Overall the SAR acquisition process can be described as a linear operation $$y = \Phi(x) + n, \quad (1)$$

where y denotes the received echoes, x is a scattering factor of an imaged area, $\Phi$ models a SAR acquisition function depending on radar parameters, and n is noise.

The image reconstruction process determines the signal of interest x by solving an inverse problem given the reflections y and the acquisition function $\Phi$. If the acquisition function $\Phi$ is invertible, an obvious choice is to use the inverse or the pseudoinverse of $\Phi$ to determine x.

In conventional SAR, this is achieved using one of the well-established algorithms, such as the Range-Doppler Algorithm (RDA), or the Chirp Scaling Algorithm (CSA).

Our reconstruction is more complicated, and sometimes underdetermined, because of the missing data. Thus, we consider the inverse $$\hat{x} = \mathrm{argmin}_x \|\Phi x - y\|_2^2 + \lambda g(x), \quad (2)$$

where the first term controls the data fidelity, and g(x) in the second term is a regularizer that incorporates the signal model for SAR images. The Lagrangian parameter $\lambda$ controls the trade-off between the two terms.

In our case, similar to compressive sensing approaches, we use $$g(x) = \|B(x)\|_1,$$

where B(•) is some basis transformation, such as a wavelets basis.

To solve this problem, we use an iterative gradient descent procedure with soft thresholding similar to a Fixed Point Continuation (FPC) algorithm. This procedure uses the acquisition operation $\Phi$ and its adjoint $\Phi^H$, which we can efficiently determine using the CSA.

FIG. 3 compare image reconstructions. FIG. 3A is for the ground truth. FIG. 3B is for conventional CSA imaging with full uniformly pulses. Obviously, the image in FIG. 3C is much more similar to the image of the ground truth in FIG. 3A. We observe that the azimuth resolution is enhanced by our random chirp timing scheme.

FIG. 4 shows a SAR system and method 400 according to embodiments of the invention. The system includes a random pulse generator 410, an echo receiver 420, and a controller 430 arranged on a moving 451 platform 450. The controller determines the pulse repetition frequency (PRF) for the pulses, and coordinates the timing of the transmitted pulses and received echoes.

Non-uniformly timed pulses 401 are transmitted by a SAR antenna 440, reflected by a target 403, and later acquired by the pulse receiver.

Compressive sensing 460, with Fixed Point Continuation (FPC) and a Chirp Scaling Algorithm (CSA) is applied to the reflected pulses to obtain sparse samples 461. A SAR image 404 is reconstructed 460 from the sparse samples.

Effect of the Invention

We describe a non-uniform pulse timing scheme with incoherent pulsing to overcome a fundamental azimuth resolution limit of conventional SAR acquisition. Our method, inspired by compressive sensing approaches, uses an iterative reconstruction algorithm for image formation. Using our approach, high azimuth resolution can be achieved without losing range coverage.

We claim:

1. A synthetic aperture radar (SAR) system, comprising:
   a non-uniform pulse generator;
   an echo receiver; and
   a processor for reconstructing a SAR image from samples of reflected echoes, wherein transmitted pulses and reflected echoes overlap in time, and wherein missing data from the overlapping pulses are at different relative locations in time.

2. The system of claim 1, wherein the transmitted pulses are orthogonal or incoherent with respect to each other to enable separation of overlapping received pulses.

3. The system of claim 1, wherein the means for reconstruction is iterative.

4. The system of claim 1, wherein the means for reconstruction uses compressive sensing.

5. The system of claim 1, wherein a pulse timing is random or pseudorandom.

6. The system of claim 1, wherein the pulse timing is periodically non-uniform.

7. The system of claim 1, wherein the missing data are evenly distributed in the SAR image, and coverage of an area of interest is approximately uniform.

8. The system of claim 1, wherein a SAR acquisition process is modeled as a linear operation.

9. The system of claim 1, wherein the reconstruction imposes a data fidelity criterion.

10. The system of claim 1, wherein the reconstruction imposes a signal model.

11. The system of claims 9 or 10, wherein there is a trade-off between the data fidelity and the signal model.

12. The system of claim 11, wherein the signal model is sparsity in a basis.

13. The system of claim 12, wherein the basis is a wavelet basis.

14. The system of claim 1, wherein the means for reconstructing uses an iterative gradient descent procedure with thresholding.

\* \* \* \* \*